US012644437B2

(12) United States Patent
De Ruiter et al.

(10) Patent No.: US 12,644,437 B2
(45) Date of Patent: Jun. 2, 2026

(54) SUPPORT STRUCTURE, A WIND TURBINE BLADE, A WIND TURBINE AND A METHOD

(71) Applicant: Ampelmann Holding B.V., Delft (NL)

(72) Inventors: Adrianus Huibert De Ruiter, Delft (NL); Jan Van Der Tempel, Delft (NL)

(73) Assignee: Ampelmann Holding B.V., Delft (NL)

( * ) Notice: Subject to any disclaimer, the term of this patent is extended or adjusted under 35 U.S.C. 154(b) by 0 days.

(21) Appl. No.: 18/875,267

(22) PCT Filed: Jun. 14, 2023

(86) PCT No.: PCT/NL2023/050330
§ 371 (c)(1),
(2) Date: Dec. 16, 2024

(87) PCT Pub. No.: WO2023/244109
PCT Pub. Date: Dec. 21, 2023

(65) Prior Publication Data
US 2025/0334103 A1 Oct. 30, 2025

(30) Foreign Application Priority Data
Jun. 15, 2022 (NL) ..................................... 2032171

(51) Int. Cl.
F03D 80/50 (2016.01)
B66C 1/10 (2006.01)
F03D 13/40 (2016.01)

(52) U.S. Cl.
CPC ............ F03D 80/501 (2023.08); B66C 1/108 (2013.01); F05B 2230/61 (2013.01)

(58) Field of Classification Search
CPC ........ F03D 80/50; F03D 80/502; F03D 13/10; F03D 13/40; F03D 13/401; F05B 2230/61; F05B 2230/6102; B66C 1/108
See application file for complete search history.

(56) References Cited

U.S. PATENT DOCUMENTS 8,544,484 B2 * 10/2013 Jensen .................... F03D 80/50
134/198
10,131,522 B2 * 11/2018 Modrego Jimenez .. B66C 1/108
(Continued)

FOREIGN PATENT DOCUMENTS

DE 202011100388 U1 12/2011
DE 102012001725 A1 8/2013
(Continued)

OTHER PUBLICATIONS

International Search Report and Written Opinion—PCT/NL2023/050330—mailing date Dec. 21, 2023.

*Primary Examiner* — Justin D Seabe
(74) *Attorney, Agent, or Firm* — Banner & Witcoff, Ltd.

(57) ABSTRACT

The invention relates to a support structure for maintenance crew for performing maintenance activities on a blade of a wind turbine. The support structure comprises two complementary sheltered workplaces, each workplace having a hinge end and a tail end. The support structure further comprises a hinge mechanism connected to the respective hinge ends of the sheltered workplaces, allowing the sheltered workplaces to swivel between an open position wherein the tail ends are offset from each other, and a closed position wherein the tail ends are adjacent to each other. The sheltered workplaces also include a deformable receiving structure for sealingly receiving a blade portion between the sheltered workplaces, in the closed position thereof.

19 Claims, 5 Drawing Sheets

(56) References Cited

U.S. PATENT DOCUMENTS

| | | | |
|---|---|---|---|
| 10,704,288 B2 * | 7/2020 | Fletcher | F03D 80/50 |
| 12,065,333 B2 * | 8/2024 | Maij | F03D 13/10 |
| 12,196,181 B2 * | 1/2025 | Martensen | F03D 80/50 |
| 12,404,840 B2 * | 9/2025 | Andersen | F03D 80/50 |
| 2012/0328399 A1 * | 12/2012 | Coloma Fernandez | F03D 13/10 414/800 |

FOREIGN PATENT DOCUMENTS

| | | | |
|---|---|---|---|
| EP | 3995693 | A1 | 5/2022 |
| NL | 2022584 | B1 | 8/2020 |
| WO | 2021043946 | A1 | 3/2021 |

* cited by examiner

SUPPORT STRUCTURE, A WIND TURBINE BLADE, A WIND TURBINE AND A METHOD

CROSS-REFERENCE TO RELATED APPLICATIONS

This application is a U.S. National Stage application under 35 U.S.C. § 371 of International Application PCT/NL2023/050330 (published as WO 2023/244109 A1), filed Jun. 14, 2023, which claims the benefit of priority to Application NL 2032171, filed Jun. 15, 2022. Benefit of the filing date of these prior applications is hereby claimed. Each of these prior applications is hereby incorporated by reference in its entirety.

The invention relates to a support structure for maintenance crew for performing maintenance activities on a blade of a wind turbine.

A support structure for maintenance crew for a blade of a wind turbine is known as such from various examples. Such a device can be used to enable maintenance crew to perform maintenance on a wind turbine blade, in particular while the blade remains connected to a nacelle of the wind turbine, i.e. typically at considerable height above ground level.

Blades of wind turbines tend to get damaged and soiled over time, in particular by precipitation such as rain and hail, especially when operating at relatively high speeds. Frequent maintenance such as repairs and cleaning is therefore required to maintain sufficiently high performance levels of wind turbines. Such maintenance generally requires maintenance crew to handle the blade from the outside, which can be challenging.

Without such a support structure, either the maintenance crew would have great difficulty in accessing the blade at height, possibly facing serious safety risks, or the blade would have to be taken down from the turbine for maintenance, to be reinstalled afterwards. The latter option, while relatively safe for maintenance crew, is time consuming and costly, especially in the case of offshore wind turbines, which are generally more difficult to access compared to land based wind turbines.

Patent publication WO 2022/093027 A1 in the name of the applicant discloses temporary support structures for maintenance crew for a blade of a wind turbine, comprising a sleeve for surrounding a wind turbine blade, using at least one inflatable part. The temporary support structure may be arranged for surrounding the blade while in a substantially horizontal or substantially vertical orientation.

It is an object of the present invention to provide a support structure for maintenance crew for performing maintenance activities on a blade of a wind turbine. It is a further object to provide a support structure for maintenance crew for performing maintenance activities on a blade of a wind turbine, the support structure increasing a weather window and/or improving quality of repairs.

Thereto, according to an aspect of the invention, a support structure is provided for maintenance crew for performing maintenance activities on a blade of a wind turbine. The support structure comprises two complementary sheltered workplaces, each workplace having a hinge end and a tail end, the support structure further comprising a hinge mechanism connected to the respective hinge ends of the sheltered workplaces, allowing the sheltered workplaces to swivel between an open position wherein the tail ends are offset from each other, and a closed position wherein the tail ends are adjacent to each other, wherein the sheltered workplaces include a deformable receiving structure for sealingly receiving a blade portion between the sheltered workplaces, in the closed position thereof.

By providing a support structure having two complementary sheltered workplaces swiveling between an open and a closed position, sealingly receiving therebetween a blade portion to be repaired, the support structure can be used as a more or less autonomous structure for maintenance crew, also in less optimal weather conditions, increasing a weather time window, extending a repair season and/or improving quality of repairs. Further, a reduced repair-time may be achieved, e.g. by using fast curing adhesives that are applicable due to the controlled environment in the sheltered workplaces. As indirect benefits, a reduced down-time can be realized, as well as a higher repair quality and better blade condition in general. Such a support structure enables safer, easier, faster and/or less costly maintenance of a wind turbine blade, and/or such a support structure is more universally usable, in particular by being relatively easy and safe to install and remove with respect to the blade, while providing good access to the blade for maintenance crew while at the same time contributing to good crew safety and well-being. As no special provisions such as anchor points are required on the blade itself, the support structure is usable for a large variety of blades including blades which have already been installed. The support structure can be installed and removed e.g. from a base and/or a nacelle of the turbine, even without help of a relatively small aerial vehicle for initial positioning of a hoist wire. No complex maneuvering of large air ships is needed, so as to optimize logistics and reduce maintenance costs, especially for large scale (offshore) windparks.

Advantageously, the two complementary sheltered workplaces are arranged to receive, in their closed position, a blade portion of a wind turbine blade, in a sealing manner, such that an air flow and/or a flow of moisture particles such as rain droplets and/or a flow of frozen particles such as snow or hail from the atmosphere outside the support structure towards the interior of the workplaces is minimized. Similarly, atmospheric conditions in the interior of the workplaces can be conditioned, e.g. by controlling temperature and/or humidity. Then, a maintenance crew can comfortably operate in the sheltered workplaces, also during less optimal weather conditions, thereby increasing a weather time window, extending a repair season and/or improving quality of repairs.

In the context of the present disclosure, a support structure can be understood as a structure which is provided at the blade for maintenance purposes around the time that maintenance is performed, in particular when the wind turbine is not operational for wind energy conversion. After maintenance has completed and before normal operation of the turbine is resumed, the support structure is removed from the blade.

In the context of the present disclosure, maintenance crew can include one or more human, (non-human) animal and/or robotic maintenance crew such as maintenance robots, either alone or in any combination. In the context of the present disclosure, maintenance can for example comprise repair work and/or cleaning work, wherein maintenance crew refers to crew who carry out such work.

A wind turbine can be understood as a turbine which harvests wind energy and converts it to another form of energy such as electricity, hydraulic energy and/or chemical energy. A wind turbine can be located offshore on land, for example. A wind turbine can be arranged in a wind turbine park or be stand-alone.

A blade of a wind turbine generally extends from a proximal end thereof which is connected, at least connectable, to a nacelle of the wind turbine, to a distal end or tip of the blade, along a main longitudinal blade axis. A longitudinal section of the blade can thus be understood being defined substantially by two mutually different positions along the longitudinal axis.

An inflatable part can be understood as a part in which air or another fluid, preferably a gas, can be introduced under pressure so that the part is distended by the fluid pressure. Inflatability can be realized through use of a suitable distendable, e.g. flexible, material, for example with a dedicated inflation opening or connection therein, for example with a valve to prevent a back flow of pressurized fluid.

Advantageously, the deformable receiving structure has been pre-formed for following the blade contour, thereby improving sealing characteristics of the support structure.

The sheltered workplaces may have an exterior wall, a platform and/or a ceiling structure that is preferably at least partly formed by an inflatable part, thereby enhancing a storing and/or handling process of the support structure.

The hinge mechanism of the support structure may be arranged for swiveling the sheltered workplaces around a swiveling axis that is oriented mainly transverse to a plane wherein the platform extends. Then, the sheltered workplaces may pivot with respect to each other as shells of an oyster for receiving and releasing the blade portion to be repaired.

The invention also relates to a wind turbine blade provided with a support structure.

Further, the invention relates to a wind turbine.

In addition, the invention relates to a method of operating a support structure.

In the following, the invention will be elucidated further using exemplary embodiments and drawings. The drawings are schematic and merely show examples. In the drawings, similar or corresponding elements have been provided with similar or corresponding reference signs. In the drawings.

Figure 1:
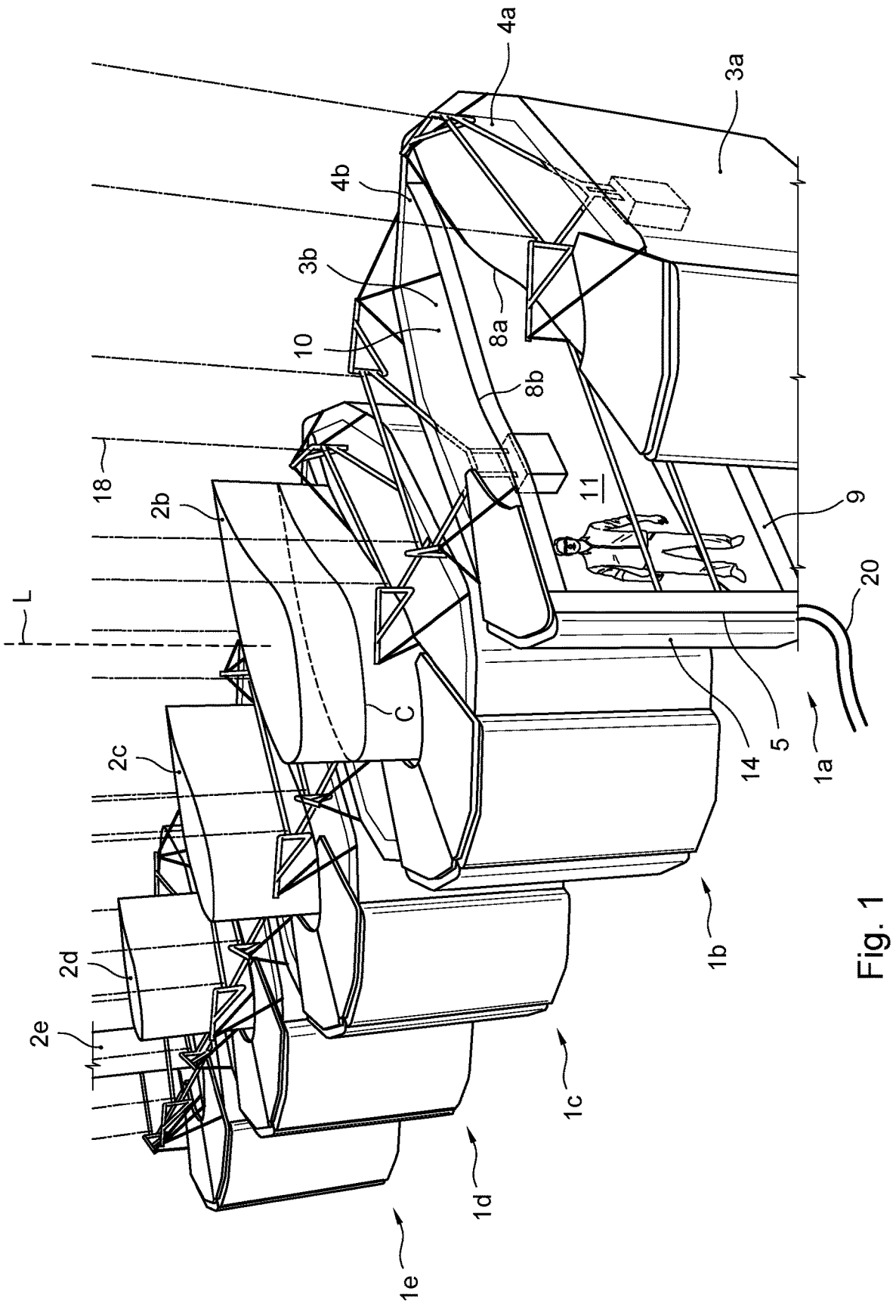
FIG. 1 shows perspective schematic views of a support structure according to the invention receiving respective blade portions of a wind turbine.

FIG. 1 shows perspective schematic views of a support structure 1 according to the invention receiving respective blade portions 2 of a wind turbine. The support structure 1 enables maintenance crew to perform maintenance activities on a blade of a wind turbine. Typically, a wind turbine is provided with a nacelle on which the blades have been mounted.

The support structure 1 has two complementary sheltered workplaces 3a-b designed so as to receive a wind turbine blade portion 2 therebetween. In FIG. 1 the support structure 1 is shown receiving blade portions that are mutually different. In the right view, the support structure 1a is ready for receiving a wind turbine blade. In a next view, to the left, of the support structure 1b, a blade portion 2b close to the wind turbine nacelle, also referred to as the root of the blade, has been received between the sheltered workplaces 3a-b. In two subsequent views of the support structure 1c-d, further to the left, respective blade portions 2c-d closer to the tip of the blade have been received between the sheltered workplaces 3a,b. In the left view of the support structure 1e, a blade tip portion 2e has been received between the sheltered workplaces 3a-b.

Figure 2:
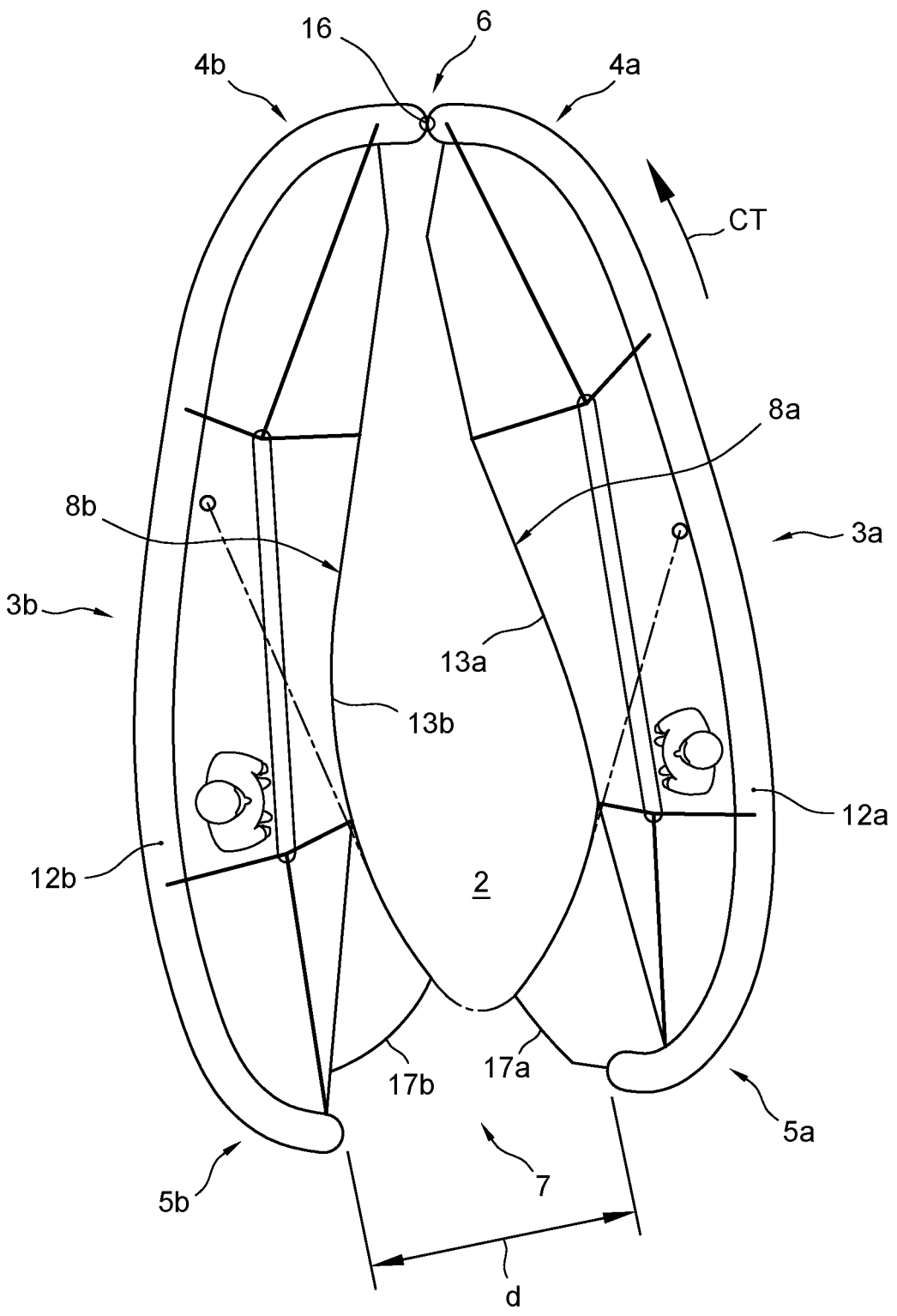
FIG. 2 shows a schematic top view of the support structure of FIG. 1.

FIG. 2 shows a schematic top view of the support structure 1. As illustrated, the sheltered workplaces 3a-b each have a hinge end 4a-b and a tail end 5a-b. Further, the support structure 1 is provided with a hinge mechanism 6 connected to the respective hinge ends 4a-b of the sheltered workplaces 3a-b, allowing the sheltered workplaces 3a-b to swivel with respect to each other between an open position and a closed position. In the open position, the tail ends 5a-b are offset from each other, defining a gap 7 between said tail ends 5a-b, while in the closed position, the tail ends 5a-b are adjacent to each other. Then, the gap 7 is reduced or even closed. In the right view of FIG. 1, the support structure 1a is in the open position, ready for receiving a wind turbine blade. In the other views of FIG. 1, the support structure 1b is in the closed position, then actually having received the respective blade portions 2.

The sheltered workplaces 3a-b further each include a deformable receiving structure 8a-b for sealingly receiving a blade 2 between the sheltered workplaces 3a-b, in the closed position thereof. The deformable receiving structure 8a-b may be made from a flexible and/or an elastic material for sealingly contacting an exterior surface of the blade portion 2. The deformable receiving structure 8a-b may be integrated with the general structure of the sheltered workplaces 3a-b or may be connected thereon as an add-on, e.g. for serviceability purposes. The deformable receiving structure 8a-b may be applied to both sheltered workplaces 3a-b, or to one of them.

The deformable receiving structure 8a-b may be arranged for surrounding a blade contour C that is mainly transverse to a longitudinal axis L of said blade 2. As an example, the described deformable receiving structure 8a-b may completely enclose the blade portion 2, along the blade contour C, or at least partially surround said blade portion 2. In the shown embodiment, the deformable receiving structure 8a-b is pre-formed for following the blade contour C, thereby improving sealing characteristics. Then, the deformable receiving structure 8 forms a blade guided design that is adaptable to the profile of the blade portion 2. In other embodiments, the deformable receiving structure 8a-b may have no pre-formed contour, e.g. for flexibility in receiving a wide variety of blade geometries.

As shown, the sheltered workplaces 3a-b have a platform 9, a ceiling structure 10 above said platform 9, and a working room 11 between the platform 9 and the ceiling structure 10. The working room 11 serves as a room for maintenance crew to perform maintenance activities to the received blade portion 2. In a closed position of the sheltered workplaces 3a-b, the crew may move between both sheltered workplaces 3a-b so as to approach the blade portion 2 from opposite sides. The sheltered workplaces 3a-b further have an exterior side wall 12 facing away from both sheltered workplaces 3a-b, and an opening structure 13 facing towards each other and towards a blade portion 2 received in the closed position of the sheltered workplaces 3a-b. The exterior side wall 12 and/or the platform 9 and/or the ceiling structure 10 is at least partly formed by an inflatable part 14. The inflatable part 14 comprises at least one inflatable rib part which is configured to stiffen the support structure 1, or at least a section thereof, when inflated. Also, the ceiling structure 10 may include an inflatable part. Further, the exterior side wall 12 may contain flexible fabric that preferably is water resistant. It is noted that the sheltered workplaces 3a-b may be implemented in another way, e.g. without an inflatable part 14. The workplaces 3a-b may each be formed as a single unit or may be constructed from respective modules mounted together.

In the shown embodiment, the deformable receiving structure 8a-b for sealingly receiving a blade portion 2 includes, on each sheltered workplace 3a-b, an top part adjacent the ceiling structure 10 and a bottom part adjacent the platform 9, for sealing the sheltered workplace above and below the working room 11. The bottom part of the deformable receiving structure 10 may be arranged for forming an outflow opening between a workplace 3a-b and the received blade portion 2, in order to facilitate an outflow of dust particles such as grinding dust particles during maintenance activities. As an example, the outflow opening might be formed using a rigid annular element integrated with said bottom part of the deformable receiving structure 10.

Optionally, the deformable receiving structure 10 includes an inflatable element to enhance a sealing effect when receiving the blade portion 2 between the workplaces 3a-b.

As shown, the tail end 5a-b of the sheltered workplace 3a-b is provided with an entrance door 17a-b enabling the crew to enter and leave the working room 11. Similarly, the support structure 1 includes a hoisting structure for carrying the sheltered workplaces 3a-b. The hoisting structure 18 may e.g. include ropes and winches for selectively hoisting and lowering the sheltered workplaces 3a-b.

In the shown embodiment, the support structure 1 further comprises a fastening element 19 such as a cable for fastening the sheltered workplaces 3 to a blade portion 2 received between them. Referring especially to FIG. 1, the support structure may also include a connection module 20 connected to an sheltered workplace 3b, including a power line, an air pressure line, an air suction line and/or a communication line.

The hinge mechanism 6 may be arranged for swiveling the sheltered workplaces 3 around a swiveling axis 16 that is oriented mainly transverse to a plane into which the platform 9 extends. Then, during operation, the platform 9 is typically oriented mainly horizontally, and the swiveling axis 16 is oriented mainly vertically allowing the tail ends 5 of the sheltered workplaces 3 to move along a mainly horizontal path.

As an example operation procedure, the support structure 1 may be used as follows. As a first step, modules of the support structure 1 are lifted individually or in combination to a tower platform of an offshore wind turbine. Technically certified persons may climb up to the nacelle of the wind turbine and drop down ropes or cables to be connected to winches on the support structure 1, the ropes and winches forming part of the hoisting structure 18 mentioned above. Preferably, the winches are located on the support structure 1 but can be located elsewhere, in principle, e.g. on the nacelle. Then, the support structure 1 may be build up, e.g. by interconnecting the complementary sheltered workplaces 3, inflating the at least one inflatable part 14 and/or lifting the support structure 1. As a next step, maintenance crew may board the support structure 1, e.g. via the entrance door 17. Then, the winches may be operated so as to hoist the support structure 1 upwardly, e.g. towards the root of the blade, near the nacelle. Here, the blade is in a mainly vertical position. The sheltered workplaces 3a-b are in the open position or are brought in said open position, ready for receiving the blade portion 2. As a next step, the blade portion 2 is actually received between the sheltered workplaces 3. Then, the sheltered workplaces 3 are pivoted, using the hinge mechanism 6, toward the closed position. The fastening element 19 may be used for fastening the sheltered workplaces 3 to the blade portion 2 received between them, e.g. employing carbon stick, a drone or other assisting element. The fastening element 19 may also be used for guiding the support structure 1 towards the blade portion 2, e.g. by winching or pulling actions.

In the closed position, the complementary sheltered workplaces 3a-b then surround the blade portion 2 received between them, in a direction CT mainly transverse to a longitudinal axis L of the blade 2. The direction CT wherein the sheltered workplaces 3a-b surround the blade portion 2 may form an open, closed or nearly closed contour CT circumscribing said blade portion 2. A sling a guidewheel may be applied around a leading edge of the blade portion 2. Further, the entrance door 17 may be closed before the maintenance crew starts actual maintenance activities to the received blade portion 2. The design of the support structure 1 minimizes a push-off system.

Figure 3:
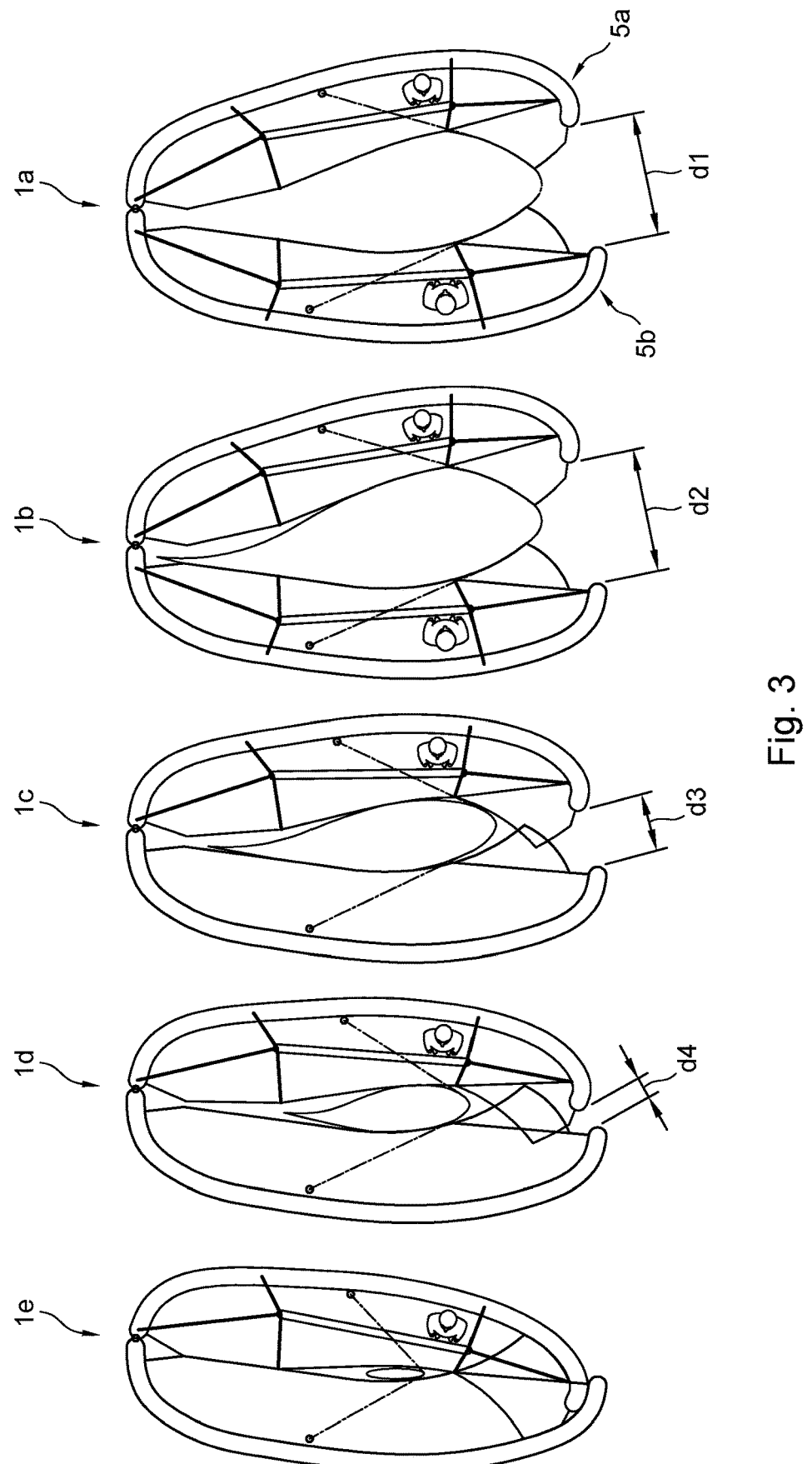
FIG. 3 shows schematic top views of the support structure of FIG. 1 shown in respective states.

FIG. 3 shows schematic top views of the support structure 1 of FIG. 1 shown in respective states, viz. an open position of the sheltered workplaces 3 having a gap with distance d1 between the tail ends 5a-b, in the right view, intermediate positions in the intermediate views having a gap with respective distances d2, d3, d4, and a closed position of the sheltered workplaces 3 wherein the gap is closed, in the left view. During swiveling, the sheltered workplaces 3 pivot with respect to each other like shells of an oyster.

After connecting the support structure 1 to the blade 2, a wind turbine blade 2 provided with a support structure according the invention is obtained. The wind turbine may be onshore or offshore.

Figure 4:
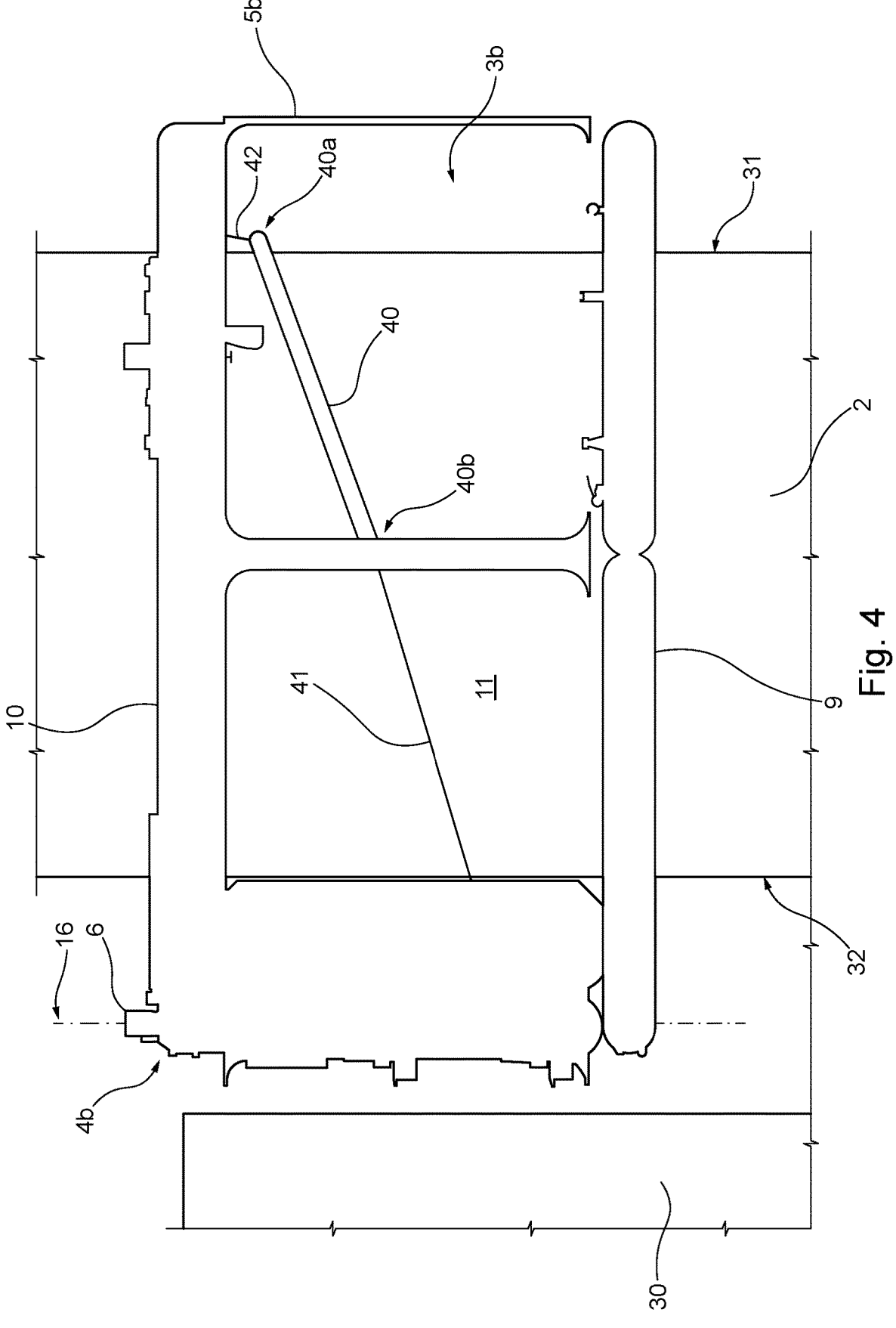
FIG. 4 shows a schematic side view of another support structure according to the invention.

FIG. 4 shows a schematic side view of another support structure. illustrated in FIG. 1. The general structure of the support structure in FIG. 4 is similar to the support structure described referring to FIGS. 1-3, including two complementary sheltered workplaces 3a-b designed so as to receive a wind turbine blade portion 2 therebetween. FIG. 4 also shows a pillar or tower 30 carrying the wind turbine blade 2 having a leading edge 31 and a trailing edge 32. Both sheltered workplaces 3a-b have a platform 9, a ceiling structure 10 above said platform 9, and a working room 11 between the platform 9 and the ceiling structure 10. The working room 11 serves as a room for maintenance crew to perform maintenance activities to the received blade portion 2. The support structure shown in FIG. 4 is provided with a moisture barrier element including an elongated elastic element or hose 40 sealingly adjoining against the surface of the wind turbine blade portion 2 such that moisture such as water droplets are hindered to flow downwardly beyond said hose 40. Preferably, the elongated elastic element or hose 40 contacts the surface of the blade portion 2 in a mainly horizontal, though slanted orientation such that water flowing downwards along the blade portion surface is sidewardly drained after reaching the hose 40. Then, the blade portion 2 below the hose 40 may be kept more or less dry enabling the maintenance crew to process said blade portion 2. In the shown embodiment, the hose 40 has an upstream end 40a and a downstream end 40b. Further, the moisture barrier element 40 is provided with an optional fixation structure 41, 42 holding the hose 40 in place. In the shown embodiment, the fixation structure includes a first rope 41 fixating the downstream end 40b to the trailing edge 32, and a second rope 42 fixating the upstream end 40a to the leading edge 31 of the blade portion 2 to fix the inclined orientation of the hose 40 while pulling the hose 40 against the surface of the blade portion 2 to provide a moisture barring or moisture hindering feature. Alternative or in addition to to the first and second ropes 41, 42, another fixation structure may be applied, e.g. using temporary fixation elements such as a single or a multiple number of vacuum connectors.

Figure 5:
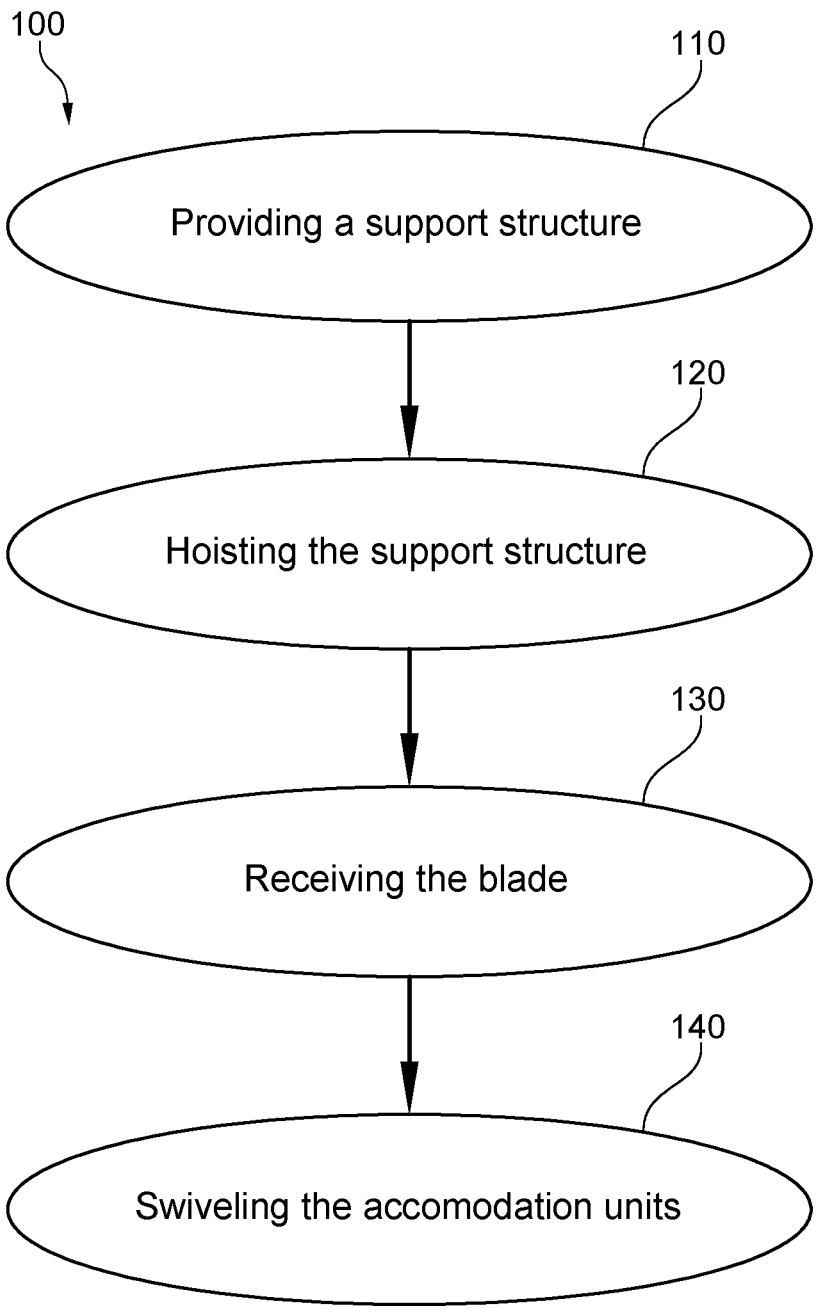
FIG. 5 shows a flow chart of a method of operating a support structure according to the invention.

FIG. 5 shows a flow chart of a method 100 of operating a support structure. The method may be used for maintenance crew for performing maintenance activities. The method 100 comprises a step of providing 110 a support structure 1 as described above, a step of hoisting 120 the support structure 1 for positioning the sheltered workplaces near a blade portion of a wind turbine, the blade being in a mainly vertical orientation, a step of receiving 130 the blade portion between the sheltered workplaces, and a step of swiveling 140 the sheltered workplaces to the closed position. The method may include a step of fastening the sheltered workplaces to the blade portion received between them.

While the invention has been described with reference to exemplary embodiments and drawings, these are not to be interpreted as limiting the invention as defined by the claims. Many variations, combinations and extensions are possible, as will be appreciated by the skilled person. Examples thereof have been provided throughout the description.

The invention claimed is:

1. A support structure for maintenance crew for performing maintenance activities on a blade of a wind turbine, the support structure comprising two complementary sheltered workplaces, each workplace having a hinge end and a tail end, the support structure further comprising a hinge mechanism connected to the respective hinge ends of the sheltered workplaces, allowing the sheltered workplaces to swivel between an open position wherein the tail ends are offset from each other, and a closed position wherein the tail ends are adjacent to each other, wherein the sheltered workplaces include a deformable receiving structure for sealingly receiving a blade portion between the sheltered workplaces, in the closed position thereof, wherein the sheltered workplaces have a platform, a ceiling structure above said platform, and a working room between the platform and the ceiling structure, and wherein the platform is at least partly formed by an inflatable part.

2. The support structure according to claim 1, wherein the deformable receiving structure is arranged for surrounding a blade contour mainly transverse to a longitudinal axis of said blade.

3. The support structure according to claim 2, wherein the deformable receiving structure has been pre-formed for following the blade contour.

4. The support structure according to claim 1, wherein the sheltered workplaces each have an exterior side wall facing away from both sheltered workplaces, and an opening structure facing towards each other and towards a blade portion received in the closed position of the sheltered workplaces.

5. The support structure according to claim 1, wherein exterior side walls of the sheltered workplaces and/or the ceiling structure are at least partly formed by additional inflatable parts.

6. The support structure according to claim 1, wherein the inflatable part comprises at least one inflatable rib part which is configured to stiffen the support structure, or at least a section thereof, when inflated.

7. The support structure according to claim 1, wherein the hinge mechanism is arranged for swiveling the sheltered workplaces around a swiveling axis that is oriented mainly transverse to a plane wherein the platform extends.

8. The support structure according to claim 1, wherein the deformable receiving structure for sealingly receiving a blade portion includes a top part adjacent the ceiling structure and a bottom part adjacent the platform.

9. The support structure according to claim 8, wherein the deformable receiving structure includes an inflatable element.

10. The support structure according to claim 8, wherein the bottom part of the deformable receiving structure is arranged for forming an outflow opening between a workplace and the received blade portion.

11. The support structure according to claim 1, wherein the complementary sheltered workplaces surround a blade portion received between them, in a direction transverse to a longitudinal axis of the blade.

12. The support structure according to claim 1, wherein the tail end of the sheltered workplace is provided with an entrance door.

13. The support structure according to claim 1, further comprising a hoisting structure for carrying the sheltered workplaces.

14. The support structure according to claim 1, further comprising a fastening element for fastening the sheltered workplaces to a blade portion received between them.

15. The support structure according to claim 1, further comprising a connection module connected to a sheltered workplace, including a power line, an air pressure line, an air suction line and/or a communication line.

16. A wind turbine blade provided with a support structure according to claim 1.

17. A wind turbine comprising the wind turbine blade according to claim 16.

18. A method of operating a support structure for maintenance crew for performing maintenance activities on a blade of a wind turbine, the method comprising the steps of:

providing the support structure according to claim 1;

hoisting the support structure for positioning the sheltered workplaces near a blade portion of a wind turbine, the blade being in a mainly vertical orientation;

receiving the blade portion between the sheltered workplaces, and swiveling the sheltered workplaces to the closed position.

19. The method according to claim 18, further comprising fastening the sheltered workplaces to the blade portion received between them.

* * * * *